US011673133B2

(12) United States Patent
Berthier et al.

(10) Patent No.: US 11,673,133 B2
(45) Date of Patent: Jun. 13, 2023

(54) APPARATUS, SYSTEMS AND METHODS FOR PREPARING AND SHIPPING SAMPLES

(71) Applicant: Tasso, Inc., Seattle, WA (US)

(72) Inventors: Erwin Berthier, Seattle, WA (US); Ben Casavant, Seattle, WA (US); Emily Welch, Seattle, WA (US); Joe Himmelheber, Seattle, WA (US)

(73) Assignee: Tasso, Inc., Seattle, WA (US)

( * ) Notice: Subject to any disclaimer, the term of this patent is extended or adjusted under 35 U.S.C. 154(b) by 14 days.

(21) Appl. No.: 17/752,310

(22) Filed: May 24, 2022

(65) Prior Publication Data

US 2022/0297114 A1      Sep. 22, 2022

Related U.S. Application Data

(63) Continuation of application No. 16/037,038, filed on Jul. 17, 2018.

(Continued)

(51) Int. Cl.
*B01L 3/00*          (2006.01)
*B04B 5/04*          (2006.01)
(Continued)

(52) U.S. Cl.
CPC .............. *B01L 3/50* (2013.01); *B01D 21/262* (2013.01); *B04B 5/0414* (2013.01); *B04B 7/02* (2013.01); *B04B 13/00* (2013.01); *B65D 59/04* (2013.01); *B65D 77/0426* (2013.01); *B65D 77/0453* (2013.01); *B01L 2200/185* (2013.01); *B01L 2300/023* (2013.01)

(58) Field of Classification Search
CPC ................. B01L 3/50; B01L 2200/185; B01L 2300/023; B01D 21/262; B04B 5/0414; B04B 7/02; B04B 13/00; B65D 59/04; B65D 77/0426; B65D 77/0453
See application file for complete search history.

(56) References Cited

U.S. PATENT DOCUMENTS 5,219,504 A * 6/1993 Insley .................... D04H 1/558
                                                       264/109
11,510,659 B2  11/2022 Berthier et al.
(Continued)

FOREIGN PATENT DOCUMENTS

TW       200914673          4/2009
TW       200914673 A  *     4/2009    ............. D06F 33/02
(Continued)

OTHER PUBLICATIONS

Fisher Scientific (Buckets and Lids for Thermo Scientific Sorvall Legend Mach 1.6 4-Place Swining Bucket Rotor, Fisher Scientific Webpage, 2015, 1 page) (Year: 2015).*
(Continued)

*Primary Examiner* — Elizabeth A Robinson
*Assistant Examiner* — Jean Caraballo-Leon
(74) *Attorney, Agent, or Firm* — Perkins Coie LLP

(57) ABSTRACT

The disclosed apparatus, systems and methods relate to sample preparation and shipping technologies in a single shippable container. The shipping container contains a single use centrifuge. The centrifuge can be temperature controlled and meets all standards and regulations for the shipping and transport of biological specimens.

30 Claims, 9 Drawing Sheets

Related U.S. Application Data

(60) Provisional application No. 62/533,323, filed on Jul. 17, 2017.

(51) Int. Cl.
  *B01D 21/26* (2006.01)
  *B65D 77/04* (2006.01)
  *B65D 59/04* (2006.01)
  *B04B 7/02* (2006.01)
  *B04B 13/00* (2006.01)

(56) References Cited

U.S. PATENT DOCUMENTS

| | | | |
|---|---|---|---|
| 2009/0191174 A1* | 7/2009 | Boudreau | A61P 7/08 424/93.73 |
| 2012/0183956 A1 | 7/2012 | Ross et al. | |
| 2013/0078149 A1* | 3/2013 | Holmes | G01N 1/40 494/9 |
| 2013/0265417 A1* | 10/2013 | Rust | G01N 33/491 494/20 |
| 2014/0336536 A1 | 11/2014 | Brancazio | |
| 2014/0342371 A1* | 11/2014 | Holmes | A61B 5/150343 435/7.1 |
| 2015/0141871 A1 | 5/2015 | Khast | |
| 2015/0182157 A1 | 7/2015 | Boriah et al. | |
| 2017/0224264 A1 | 8/2017 | Brancazio | |
| 2018/0008183 A1 | 1/2018 | Chickering, III et al. | |
| 2019/0015031 A1 | 1/2019 | Liepold et al. | |
| 2019/0015827 A1 | 1/2019 | Berthier et al. | |
| 2020/0146606 A1 | 5/2020 | Casavant et al. | |
| 2021/0007651 A1 | 1/2021 | Donnay et al. | |

FOREIGN PATENT DOCUMENTS

| | | |
|---|---|---|
| WO | WO2007111651 | 10/2007 |
| WO | WO2011119896 | 9/2011 |
| WO | WO2016025843 | 2/2016 |
| WO | WO2016140750 | 9/2016 |
| WO | WO2020102281 | 5/2020 |
| WO | WO2021222066 | 11/2021 |

OTHER PUBLICATIONS

Javier Atencia and David J. Beebe, "Controlled Microfluidic Interfaces," Sep. 29, 2005, pp. 648-655, vol. 437, No. 7059, Publisher: Nature.

Scott M. Berry, Elaine T. Alarid, and David J. Beebe, "One-step purification of nucleic acid for gene expression analysis via Immiscible Filtration Assisted by Surface Tension (IFAST)," May 21, 2011, pp. 1747-1753, vol. 11, No. 10, Publisher: Lab Chip.

David Chunningham, Timothy Henning, Eric Shain, Douglas Young Jurgen Hanning, Eric Barua, and Raphael Lee, "Blood extraction from lancet wounds using vacuum combined with skin stretching," Nov. 9, 2001, pp. 1089-1096, vol. 92, No. 3, Publisher: J Appl Physiol.

H Fruhstorfer, H Lange, "Capillary blood sampling: how much pain is necessary? Part 3: Pricking the finger can be less painful," Feb. 1, 1995, pp. 253-254, vol. 12, No. 6, Publisher: Practical Diabetes International.

H Fruhstorfer and T Muller, "Capillary blood sampling: how much pain is necessary? Part 1: Comparison of existing finger stick devices," Feb. 1, 1995, pp. 72-74, vol. 12, No. 2, Publisher: Practical Diabetes International.

H Fruhstorfer, T Muller, and E Scheer, "Capillary blood sampling: how much pain is necessary? Part 2: Relation between penetration depth and puncture pain," Feb. 1, 1995, pp. 184-185, vol. 12, No. 4, Publisher: Practical Diabetes International.

Heinrich Fruhstorfer, Gunther Schmelzeisen-Redeker, and Thomas Weiss, "Capillary Blood Sampling: relation between lancet diameter, lancing pain and blood volume," 1999, pp. 283-286, vol. 3, No. 3, Publisher: European Journal of Pain.

H Fruhstorfer, K Selzer, and O Selbman, "Capillary blood sampling: how much pain is necessary? Part 4: Comparison of lancets for automatic lancing devices," Jul. 24, 1995, pp. 58-60, vol. 13, No. 2, Publisher: Practical Diabetes International.

Heinrich Fruhstorfer, "Capillary Blood Sampling: the pain of single-use lancing devices," 2000, pp. 301-305, vol. 4, No. 3, Publisher: European Journal of Pain.

Chia-Hsien Hsu, Chihchen Chen, and Albert Folch, "Microcanals for micropipette access to single cells in microfluidic environments," Jul. 23, 2004, pp. 420-424, vol. 4, No. 5, Publisher: Lab Chip.

J. Berthier, F. Loe-Mie, V.-M. Tran, S Schoumacker, F. Mittler, G. Marchand, N. Sarrut, "On the Pinning of Interfaces on Micropillar Edges," Jun. 3, 2009, pp. 296-303, vol. 338, No. 1, Publisher: J Colloid Interface Sci.

Sung Hoon Lee, Austen James Heinz, Sunghwan Shin, Young-Gyun Jung, Sung-Eun Choi, Wook Park, Jung-Hye Roe, Sunghoon Kwon, "Capillary Based Patterning of Cellular Communities in the Laterally Open Channels," Apr. 1, 2010, pp. 2900-2906, vol. 82, No. 7, Publisher: Anal Chem.

"Open Microfluidic and Nanofluidic systems," Feb. 15, 2005, pp. 1848-1852, vol. 102, Publisher: PNAS.

Nuno M. Oliveira, Ana I. Neto, Wenlong Song, and Joao F. Mano, "Two-Dimensional Open Microfluidic Devices by Tuning the Wettability on Patterned Superhydrophobic Polymeric Surface," Aug. 6, 2010, vol. 3:085205, Publisher: Appl Phys Express.

Jessica Olofsson, Johan Pihl, Jon Sinclair, Eskil Sahlin, Mattias Karlsson, and Owe Orwar, "A Microfluidics Approach to the Problem of Creating Separate Solution Environments Accessible from Macroscopic Volumes", Sep. 1, 2004, pp. 4968-4976, vol. 76, No. 17, Publisher: Anal Chem.

Ralf Seemann, Martin Brinkmann, Edward J. Kramer, Frederick F. Lange, and Reinhard Lipowsky, "Wetting morphologies at microstructured surfaces," Dec. 16, 2004, pp. 1848-1852, vol. 102, No. 6, Publisher: Proc Natl Acad Sci USA.

Bin Zhao, Jeffrey S. Moore, and David J. Beebe, "Surface-Directed Liquid Flow Inside Microchannels," Feb. 9, 2001, pp. 1023-1026, vol. 291, No. 5506, Publisher: Science.

International Search Report and Written Opinion received for PCT Application No. PCT/US19/61087; Applicant: Tasso, Inc., dated Jan. 30, 2020, 10 pages.

Extended European Search Report received for EP Application No. 19884038.1, Applicant: Tasso, Inc, dated Jun. 15, 2022, 11 pages.

International Search Report and Written Opinion received for PCT Application No. PCT/US21/29082; Applicant: Tasso, Inc., dated Aug. 10, 2021, 12 pages.

\* cited by examiner

APPARATUS, SYSTEMS AND METHODS FOR PREPARING AND SHIPPING SAMPLES

CROSS-REFERENCE TO RELATED APPLICATIONS

This application is a continuation of U.S. patent application Ser. No. 16/037,038, filed Jul. 18, 2018, which claims priority to U.S. Patent Application No. 62/533,323, filed Jul. 17, 2017, each of which is herein incorporated by reference in its entirety.

STATEMENT REGARDING FEDERALLY SPONSORED RESEARCH

This invention was made with government support under Contract R44DK108689, awarded by the National Institute of Diabetes and Digestive and Kidney Diseases of the National Institutes of Health. The government has certain rights in the invention.

TECHNICAL FIELD

The disclosed technology relates generally to preparing and/or shipping biological samples collected in any environment, and in particular, to the devices, methods, and design principles allowing the efficient preparation and shipping of bodily fluid samples.

BACKGROUND

The disclosure relates to apparatus, systems and methods for preparing and shipping bodily fluid samples collected in any environment, including non-clinical environments. While analysis laboratories are well suited to perform diagnostic tests, the collection of bodily fluid samples remains challenging, in particular for patients that do not have easy access to a suitable laboratory.

Devices, systems and methods to collect bodily fluids are necessary devices for the growing field of personalized medicine. As point-of-care devices continue to improve, an often overlooked area lies within the collection of samples from untrained users. Currently, biological samples are most commonly obtained via either simple-to-use methods or devices, as with generic lancing devices, or trained personnel, as with phlebotomy venipunctures. In order to transfer the bodily fluid to a container, receptacle, or an analysis device, multiple steps are required that are time consuming, error prone and/or cumbersome.

Patients without easy access can be located in rural areas, underserved urban and sub-urban areas, low resource areas, or generally do not have time or means to visit a laboratory, creating significant barriers to accessing diagnostic services. In order to reach patients in all locations, and connect them with suitable laboratories, robust systems for bodily fluid sample acquisition, stabilization, and shipping are required.

Thus, there is a need in the art for improved bodily fluid collection devices that can be self-applied at the convenience of the patient and utilize simple, cost-effective methods to handle bodily fluid samples, prepare and stabilize samples for transportation, and allow the robust transport to an analysis laboratory. More specifically, there is a need for simple and robust methods and devices to extract components of a blood sample, add reagents to the samples, and package the sample for safe and reliable transport. The disclosed methods and devices are simple to operate in any environment without additional equipment and/or any specific training.

Thus, there is a need in the art for improved apparatus, systems, and methods for bodily fluid sample preparation.

SUMMARY

Discussed herein are various devices, systems and methods relating to a centrifugal separation system that is contained within a shipping container.

In one Example, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In Example 1, a system for sample preparation and transportation comprising an openable shippable container and a centrifuge frame comprising a rotor, the centrifuge frame being disposed within the shipping container, wherein the centrifuge frame is constructed and arranged to centrifuge and ship a biological sample.

In Example 2, the centrifuge frame of Example 1 is constructed and arranged so that the rotor is actuated by closing the openable shipping container.

In Example 3, the system of Example 1, wherein the rotor contains an opening for a biological sample and an integrated counter-balancing weight.

In Example 4, the system of Example 1, comprising electronics, and wherein the rotor is constructed and arranged so as to be a single-use rotor.

In Example 5, the system of Example 1, wherein the centrifuge frame comprises at least one switch constructed and arranged to control the operation of the rotor.

In Example 6, the system of Example 5, further comprising a battery in operational communication with the at least one switch.

In Example 7, the system of Example 6, wherein the shipping container comprises a lid, the lid being in operational communication with the at least one switch.

In Example 8, the system of Example 1, wherein the centrifugation frame comprises at least one battery and a PCB that is operationally coupled to the rotor, wherein the PCB is constructed and arranged to be pre-programmed for a variety of sample types.

In Example 9, the system of Example 8, wherein the PCB is operationally integrated with communications components that are constructed and arranged to wirelessly communicate with a receiver.

In Example 10, the system of Example 9, wherein the receiver is constructed and arranged to detect the success of a centrifugation event.

In Example 11, the system of Example 10, wherein the receiver measures and communicates temperature and time data with the PCB.

In Example 12, the system of Example 1, wherein the system is constructed and arranged to separate into reusable sub-components.

In Example 13, the system of Example 1, wherein the shippable container is constructed and arranged to absorb biological samples in the event of a spill.

In Example 14, a method for preparing and shipping biological samples comprising centrifuging a sample with a rotor disposed within a shippable container, stabilizing the sample for shipping with a gel and/or a chemical reagent, and shipping the sample by mail or courier.

In Example 15, the method of Example 14, wherein centrifugation occurs exactly once.

In Example 16, the method of Example 15, wherein centrifugation parameters are pre-set.

In Example 17, the method of Example 14, wherein a wireless communications component within the shippable container communicates sample data.

In Example 18, a device for sample preparation and shipping comprising a shippable container, a centrifugation mechanism disposed within the shippable container that is constructed and arranged to accept and centrifuge a biological sample, a temperature control system and a communications component In Example 19, the device of Example 18, wherein the centrifugation mechanism further comprises: a rotor, wherein the biological sample and a counter-weight is housed; a motor in mechanical communication with the rotor; a PCB in electrical communication with the motor and a battery; and a battery in electrical communication with at least two switches.

In Example 20, the device of Example 18, wherein the temperature control system is in thermodynamic communication with the sample.

Other embodiments of this aspect include corresponding computer systems, apparatus, and computer programs recorded on one or more computer storage devices, each configured to perform the actions of the methods.

In various implementations, the system allows for rapid collection and shipping of biological samples, including meeting shipping and transportation requirements regarding the containment of biological samples, including double hulled containment, packaging labeling, and the like.

In one example, the sample preparation unit can be programmed to allow the preparation of various types of sample including, without limitation: serum separation; plasma separation; the acquisition of platelet rich plasma; the acquisition of platelet poor plasma; the separation of specific cell types; the mixing of stabilization chemistries in the sample; the release of a reagent into the sample when the centrifuge starts; centrifugal-induced mixing of the sample or reagents to mix, thus preventing sedimentation during transportation.

In certain implementations, the stabilization of the sample can be enhanced through additional means contained in a secondary sub-unit, and can include phase change wax compartments contained within the unit; a micro-cooling system to refrigerate samples; and/or centrifugal force-induced release of a second liquid into the sample for stabilization.

In other examples, a sample preparation sub-unit can also include analysis components to provide direct readout of certain metrics of the sample(s), including spectrometry readouts, that can be used alone or in conjunction with future, additional analysis in a laboratory. Immediate analysis readouts can be accomplished in various ways including, without limitation: spectrometry or infrared readouts of certain components of a sample including, without limitation, hemoglobin, oxygen, etc.

In certain implementations, a centrifugation step can be followed by the release of plasma/serum into an analyzer module.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various embodiments disclosed or contemplated herein relate to preparing biological specimens, such as blood, for shipment or transport. In various implementations, the sample preparation system is embodied as a centrifuge, using a motor to create a defined centrifugal force on the sample contained within the rotor in order to separate specimen components using gravity. When used in conjunction with a tube containing particular gels or reagents known in the art, the centrifuge separates the individual components of the sample, as would be well appreciated in the art.

It is understood that the various embodiments or devices, methods, and systems disclosed herein can be incorporated into or used with any other known medical devices, systems, and methods. For example, the various embodiments disclosed herein may be incorporated into or used with any of the medical devices and systems disclosed in U.S. Pat. No. 9,289,763, filed Jul. 23, 2013, entitled "Methods, Systems, and Devices Relating to Open Microfluidic Channels," U.S. Pat. No. 9,987,629, filed Feb. 25, 2016, entitled "Methods, Systems, and Devices Relating to Open Microfluidic Channels," U.S. application Ser. No. 13/750,526, filed Jan. 25, 2013, entitled "Handheld Device for Drawing, Collecting, and Analyzing Bodily Fluid," U.S. application Ser. No. 14/816,994, filed Aug. 3, 2015, entitled "Devices, Systems, and Methods for Gravity-Enhanced Microfluidic Collection, Handling and Transferring of Fluids," and U.S. application Ser. No. 15/387,177, filed on Dec. 21, 2016, entitled "Devices, Systems and Methods for Actuation and Retraction in Fluid Collection," all of which are hereby incorporated herein by reference in their entireties.

Figure 1A:
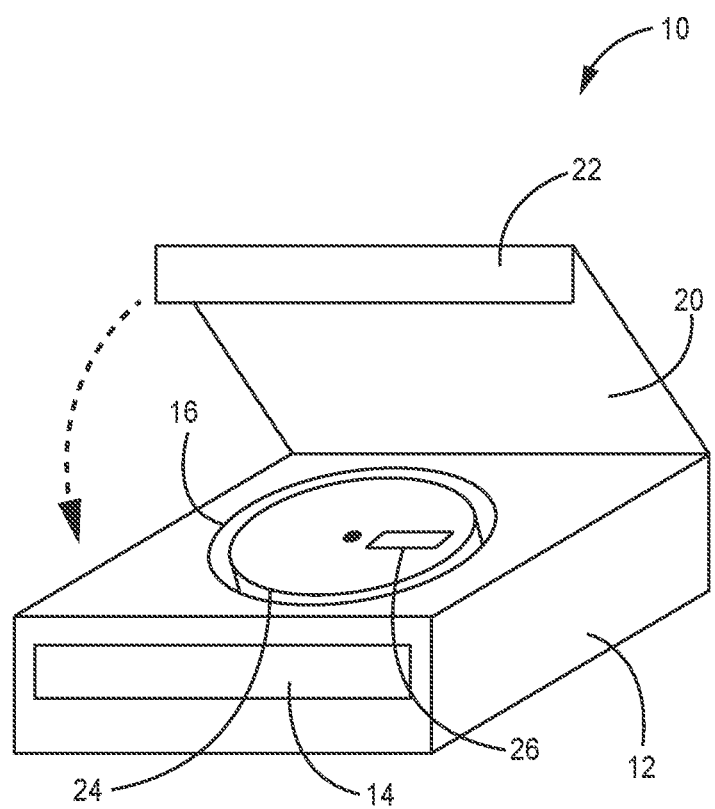
FIG. 1A is a perspective view of the transportation container, according to one embodiment.
Figure 1B:
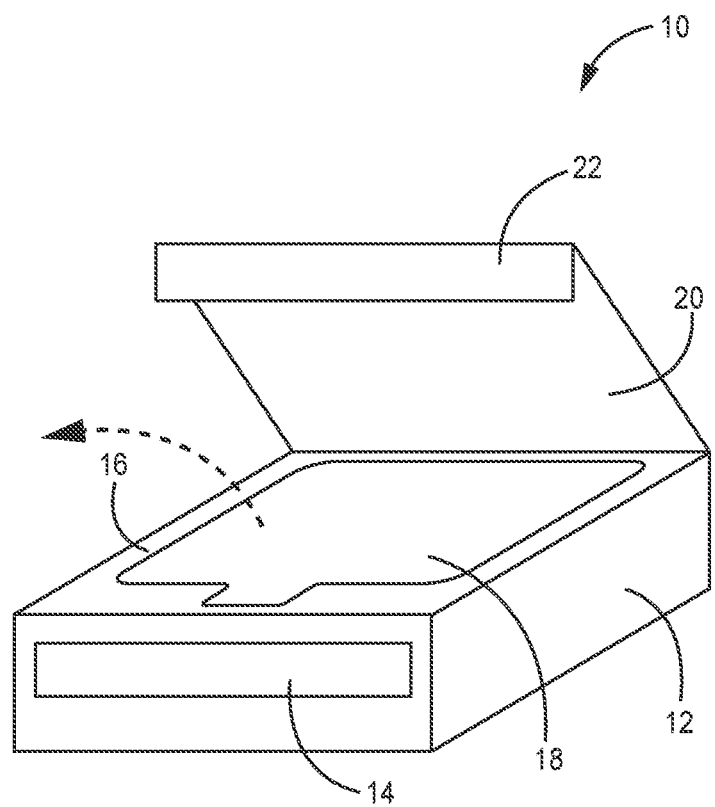
FIG. 1B is a perspective view of the transportation container exposing the rotor, according to one embodiment.

Turning to the drawings in greater detail, FIG. 1A and FIG. 1B depict exemplary implementations of the preparation and transportation/shipping device, or centrifuge system 10. According to the implementations of FIG. 1A and FIG. 1B, the centrifuge system 10 generally has a housing 12 containing a centrifuge frame 16 supporting a rotor 24, which are covered by a lid 20.

In these and other implementations, the rotor 24 has at least one opening 26 constructed and arranged to accept a biological sample (such as in a sample tube discussed below at 36) for centrifugation and transport. As such, it is understood that simple usability has been contemplated in the design to make the device and centrifuge system 10 as easy-to-operate as possible enabling use of the system 10 in the home, basic clinic, field, and/or retail settings.

Figure 2A:
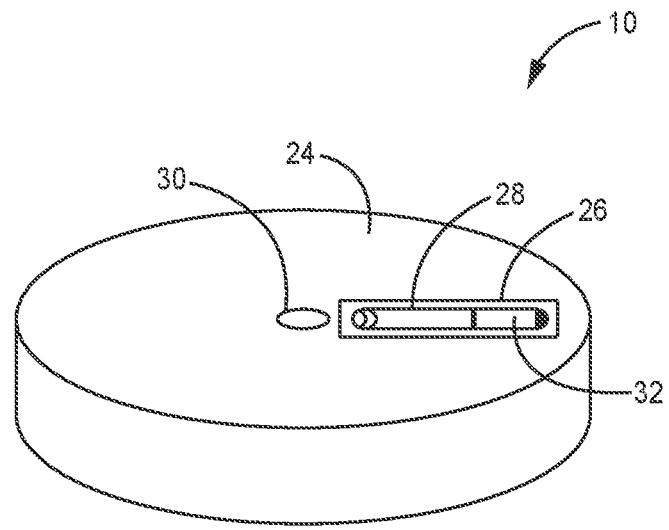
FIG. 2A is a perspective view of the rotor, including the sample housing, according to one embodiment.
Figure 2B:
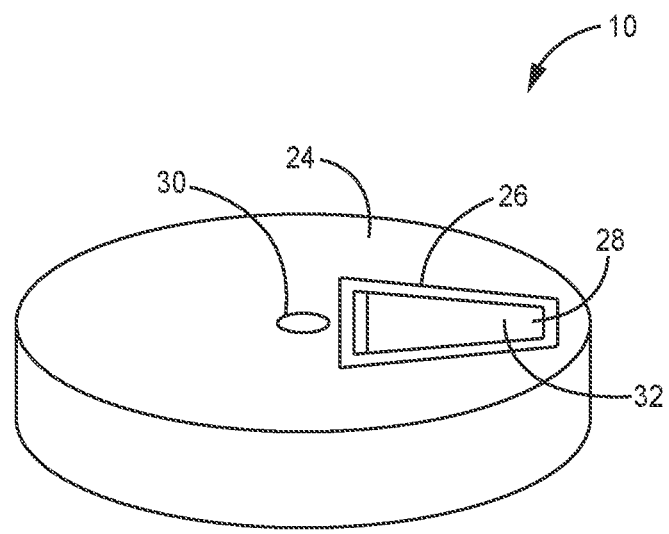
FIG. 2B is a perspective view of the rotor, including a removable container in the sample housing, according to one embodiment.

It is understood that the rotor 24 contains the biological sample(s) and spins at a defined RPM to perform separation of subcomponents of a sample. As shown in the implementations of FIG. 2A and FIG. 2B, the rotor 24 can contain configurations that allow for either manual or automatic closing of a sealed compartment to house the biological sample after the user places the sample into the rotor 24.

In the implementations of FIG. 1A and FIG. 1B, the system 10 has a covering 18 on the rotor (FIG. 1A at 24) that can be removed to activate the centrifuge 16. In use according to other embodiments described in relation to FIG. 1C and FIG. 1D, the opening of the lid 20 can activate the centrifuge 16 without the covering. It is understood that enabling the automatic activation of the centrifuge 16 via the opening of the lid 20 and/or cover 18 would be achievable through a variety of structural configurations readily appreciated by those of skill in the art. In the implementations of FIG. 1A and FIG. 1B, the lid 20 has a tab 22.

According to these implementations, after a sample 26 is processed and is ready to be transported and/or shipped for analysis, the tab 22 can be affixed to the device housing 12 with adhesive 14 to prevent the centrifuge 16 from being re-opened. In various implementations, the adhesive 14 is single usage tape. It is understood that in other embodiments, the lid 22 can be closed with other methods or mechanisms known in the art.

The centrifuge system 10 according to these implementations has been constructed and arranged to meet or exceed the requirements of shipping and/or transporting biological samples, in particular to achieve a compact size, low cost, disposal of elements that may be contaminated by biological samples, and include all necessary components to meet the regulations of biological sample transportation set forth in UN Recommendation 3733 and International Air Transport Association Rule 3.6.2.

Continuing with the drawings, FIG. 1A shows an implementation of the centrifuge system 10 with the rotor 24, with the protective covering removed (shown in FIG. 1B at 18), such that the rotor 24 is exposed for sample insertion. In this implementation, the rotor 24 comprises an opening 26 that is constructed and arranged to accept the sample for centrifugation.

Figure 1C:
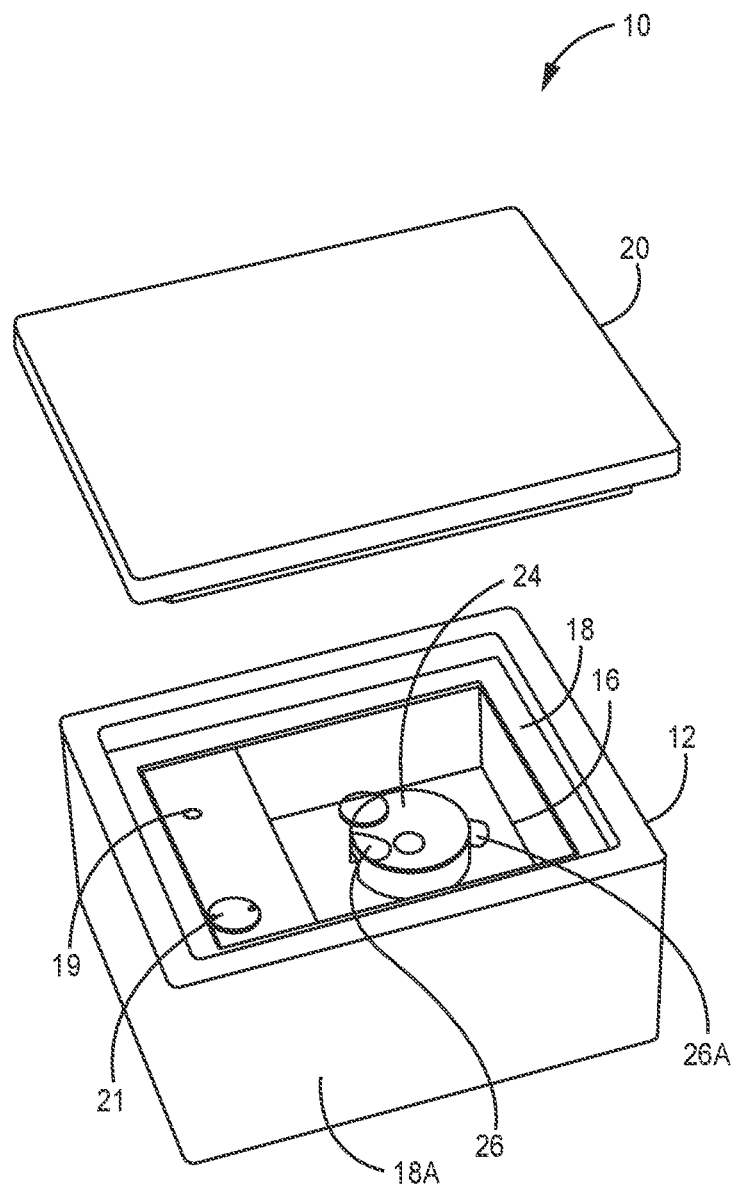
FIG. 1C is a perspective view of the transportation container with a lid removed that exposes the inside of a housing, according to one embodiment.
Figure 1D:
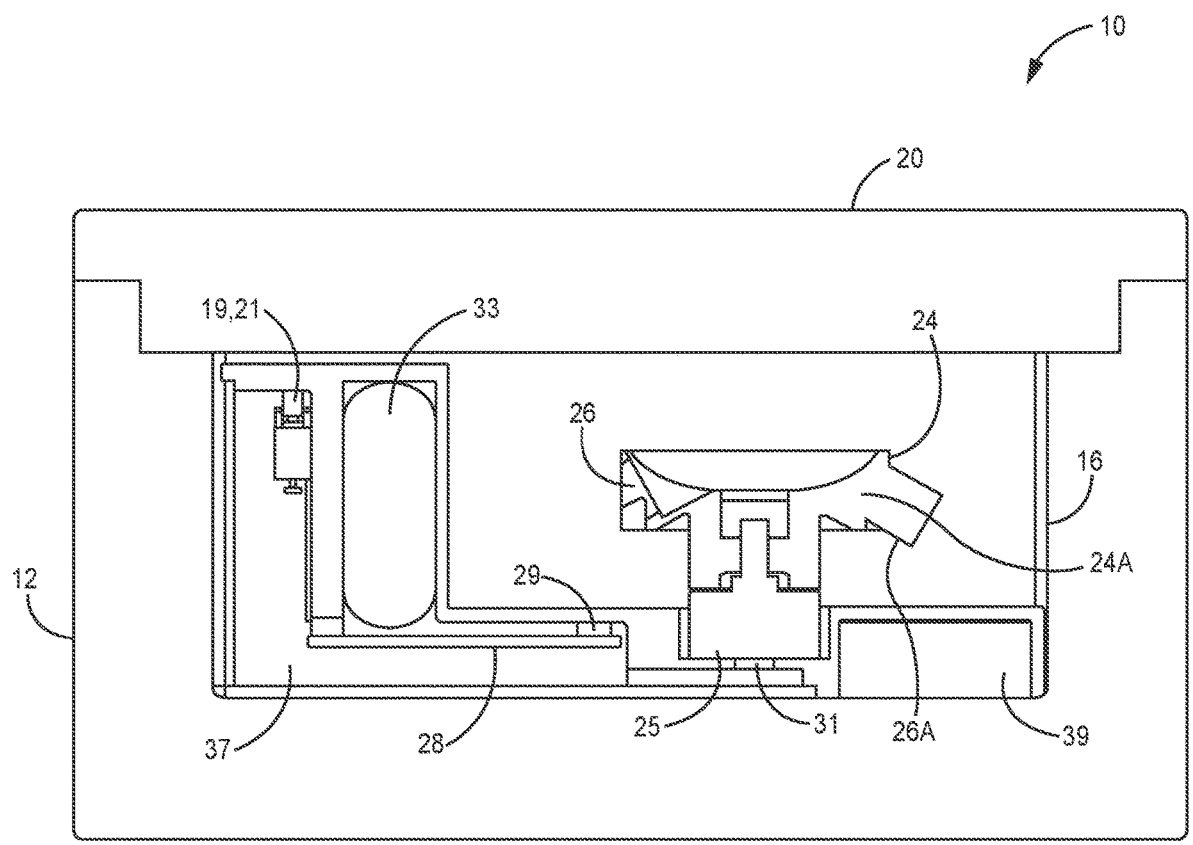
FIG. 1D is a cross-sectional side view of the transportation container, according to one embodiment.

FIG. 1C and FIG. 1D depict an implementation of the system 10 having a detachable lid 20. In these implementations, the lid 20 is secured within the housing 12 when not in use, as would be understood. It is further understood that in various implementations, the housing 12 and lid 20 are foam or other thermodynamically favorable materials such as polystyrene (EPS).

As shown in the implementation of FIGS. 1C and 1D, the housing 12 contains a rotor 24 disposed within a cavity 24A at the base of the centrifuge frame 16. As described in relation to FIG. 1D, the centrifuge frame 16 contains openings 37, 39 for supporting various electronics such as PCBs 28, batteries 33, switches 19, 21 and a motor 25. In various implementations, the frame 16 is made of plastic or other light and rigid materials understood such as metals, polymers or composites.

In certain implementations, the lid 20 may serve as the only covering, whereas in alternate implementations like that of FIG. 1A and FIG. 1C, an additional covering 18 may be constructed and arranged to cover the centrifuge 16 and the rotor 24.

In the implementation of FIG. 1C, the cover 18 has a cover opening 18A. In use according to these implementations, the cover opening 18A is constructed and arranged to accommodate direct passage of a biological specimen into a rotor opening 26 which is in turn constructed and arranged to accept a biological specimen for centrifugation. FIG. 1C and FIG. 1D further show a counterbalance 26A disposed opposite the opening on the rotor, as would be understood by those of skill in the art.

In exemplary embodiments, the biological specimen can be in a container such as a HemoLink tube 36 from the user. In other embodiments, the rotor opening 26 is constructed and arranged to accept a tube in only one direction, ensuring correct processing of the sample. It is understood that many configurations are possible.

It is understood that these implementations of the cover opening 18A and rotor opening 26 are constructed and arranged so as to allow for the ease of use, that is, passage of the biological specimen into the rotor 24 for use. It will be appreciated that the cover 18 can be constructed from any number of materials, some non-limiting examples being plastic, Tyvek® and cardboard.

As the centrifuge may be re-utilized it is beneficial to discard any part that may have come in contact with biological samples. A possible embodiment is to place the electronics and re-useable parts on a frame made of metal or hard plastic. The outer parts of the centrifuge can be made of easily discardable materials, such as cardboard. These parts would mostly be used to shield the electronics from sample spills as well as improve the usability of the device by hiding undesirable elements.

Various implementations of the system 10 are constructed and arranged to have automated actuation and safety stop features. In these implementations, the centrifugation process must be started only when the sample has been placed in the rotor without requiring the operation of any manual switch. In one embodiment a switch that is actuated when the lid is closed that can initiate the centrifugation process as well as operate as a safety switch. In these implementations, the switch must be protected from being actuated during shipping such that the centrifuge will only operate after the user places the sample in the rotor.

Continuing with the implementation of FIG. 1C, in this implementation a kill or locking switch 19 and activation switch 21 are provided. In these implementations, the locking switch 19 is constructed and arranged so as to prevent the operation of the centrifuge during transportation. In exemplary implementations, the locking switch 19 prevents activation of the centrifuge via a stored tube or tube cap (such as that described below in relation to FIG. 2C) in the locking switch 19 opening, as would be understood. In alternate implementations, the locking pin 19 can be activated/deactivated via an aligned pin that extends into an opening activating the locking switch 19 or other components and approaches understood in the art.

The lid is designed to interface with the frame and actuate switches to start or stop the process. The lid must have sufficient rigidity to avoid coming in contact with the spinning rotor. In use according to these implementations, when the user removes the tube 36 or tube cap from the locking switch 19 opening, the locking switch 19 is disabled. Subsequently, when the lid is returned to the closed position, the activation switch 21 is able to start the centrifuge 16, such as via a magnet disposed within the lid 20 that is constructed and arranged to activate the switch 21 and initiate centrifugation.

In the implementations, the switches 19, 21 are secured to the frame 16 and in operational communication with the rotor 24. That is, the rotor 24 is in operational communication with a motor 25 disposed within the housing 12, as well as with a printed circuit board (PCB) 28 via a PCB mount 29 and motor mount 31. In various implementations, the PCB 28 is constructed and arranged to operate and control of the timing and speed of the centrifuge rotor 24.

In various implementations, such as that of FIG. 1D, the centrifuge can be powered by a battery 33 and/or be plugged in to a power source.

Further, the PCB (or other microcontroller) 28 of these implementations is in operational communication with the switches 19, 21 and other electronic components such as memory, processors or other electronic devices known in the art. In exemplary implementations, they can be housed in a first cavity 37 defined within the frame.

Continuing with the switches 19, 21, in various implementations, the system 10 can be programmed such that the activation switch 21 initiates a timer on the PCB 28 or other control component to ensure that the sample has sufficient time to absorb reagent, clot, come to a specified temperature and/or meet some other condition or criteria understood by the skilled artisan.

That is, many different types of blood-related samples can be needed depending on the clinical analysis being performed. Typically, a centrifuge would have rotation speed controls and switches. In contrast, an aim of the shippable centrifuge system 10 is simplicity, and as such can be pre-programmed for execution of a specified assay, such as that which would be based on a prescription.

In various implementations, the PCB 28 or other microcontroller can be programmed to achieve a number of other objectives. For example, in order to ensure a quality sample upon reception, it is important to track the time at which the sample was acquired and the environment through which the sample was subjected. Accordingly, in certain implementations the PCB 28 or other microcontroller can be constructed and arranged to log time and temperature in order to reject samples that may have been subjected to out-of-specification conditions.

In various implementations of the system 10, the electronic components such as the PCB 28 are constructed and arranged to allow the system 10 to test the power supply to ensure sufficient voltage for operation. Because the rotor speed will vary depending on the voltage, it is important to have an internal test of the power supply onboard the shippable sample preparation system or as an included part of the system. If the power supply has insufficient voltage, an advantage of the system is that the power supply can be recharged or removed and replaced.

The electronic components also allow for several safety and consistency features. For example, redundant batteries or other power sources can be provided within the frame 16. That is a primary larger capacity battery 33 can be provided to power the rotor 24, and another smaller capacity battery disposed, for example, on the PCB 28 or elsewhere within the frame 16. This secondary battery (shown generally in the cavity at 37) can operate basic tasks with the onboard electronics/PCB 28. In certain implementations the larger capacity primary battery is a removable lithium ion battery or another battery with a larger capacity and density with a smaller footprint while the secondary battery is be a non-lithium ion battery to comply with shipping regulations.

Another safety feature within the device is to have a program or switch within the device that ensures the sample is only centrifuged at least and no more than one time. This means that if for some reason the centrifuge is interrupted mid-cycle, the centrifuge will be able to re-start to spin one time. If the device is opened after centrifugation is completed, it will not re-centrifuge the contents.

In other embodiments, the shippable sample preparation system 10 can contain wireless communication capabilities, such as but not limited to, NFC or Bluetooth® systems allowing for the transmission of data from the system to a user's smartphone device or a dedicated reader. In various implementations, these are disposed within the electronics housing 37 and in operational communication with the battery 33, PCB 28 and/or any other modules or processors and sensors necessary to perform the contemplated functions.

In certain implementations, the system 10 is constructed and arranged to record information about the sample processing, such as the activation time, the duration of the processing, the centrifugation speed, as well as the shipping conditions through time. In various implementations, a data storage device such as memory or a drive (not shown) are provided to store data. Additional information on the success of the centrifugation, geolocalization of the sample when the system was actuated and through time can be recorded from sensors (not shown) interconnected with the PCB and/or other components, such as GPS sensors and the like.

In various implementations, recorded data can be transmitted to the user or laboratory to assess quality metrics or other statistics about the patient or sample. Reversibly, information can be transmitted to the shippable sample preparation system via wired or wireless connections, thereby allowing the storage of the list of analytes that will be measured on the sample, which can replace or complement a laboratory requisition form, as well as the sample preparation parameters, such as centrifugation time, speed, and the like. It is understood that a further suite of known electronic components can be stored within the frame and placed into operational communication with the battery 33 and/or other electronic components so as to be constructed and arranged to effectuate the data collection and communication functions contemplated here.

As also shown in FIG. 1D, in these implementations a cavity 39 is disposed within the housing, which is constructed and arranged to hold a cooling element (FIG. 4B at 58), which is in thermodynamic communication with the rotor 24 and sample.

As shown in FIG. 2A, the rotor 24 of this implementation has a removable sample 32 constructed and arranged to fit within the opening 26. In this implementation, the rotor 24 connects to the motor (as shown in FIG. 1D at 25) in the housing (in FIG. 1A at 12) via an axle 30 disposed substantially at the center of the rotor 24.

In the implementation of FIG. 2B, the rotor 24 shows an implementation of the opening 26 constructed and arranged to accept a sample 32 housed in an optional additional removable container 34. It is understood that shipping liquid blood samples can require the use of a double-hulled container to prevent unwanted spillage. Certain implementations achieve this double-hulling by placing the sample 32 in a tube (primary container) 36 and having the secondary container 34 be a small container holding the tube, or the rotor 12 itself, or the box of the centrifuge. In various implementations, the secondary containment can be accomplished by having self-closing lids on the rotor actuated by the centrifugal forces or inertial forces that occur at the start or during centrifugation, as would be understood.

Figure 2C:
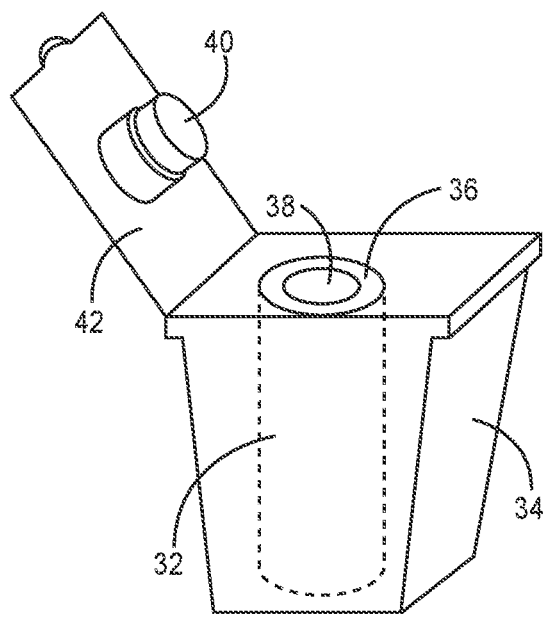
FIG. 2C is a perspective view of the removable container, according to one embodiment.

As shown in FIG. 2C, in certain implementations, the removable container 34 defines a lumen and contains a tube 36 disposed therein, the tube 36 defining a sample lumen 38. In these implementations, the container 34 can be removed for sample 32 insertion, and can integrate a tube cap 40 onto the lid 42 for forming a seal with the top of the tube 34. In these implementations, the removable container 34 can contain absorptive materials and/or reagents for addition to the sample tube 36.

Figure 2D:
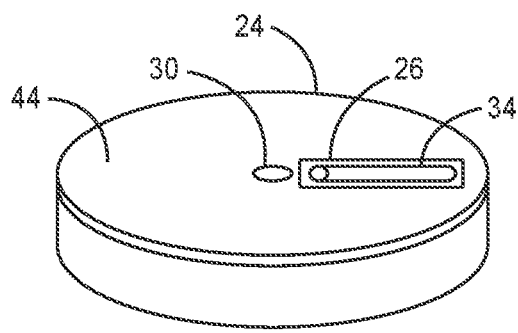
FIG. 2D is a perspective view of the rotor with an automatically closing lid, according to one embodiment.
Figure 2E:
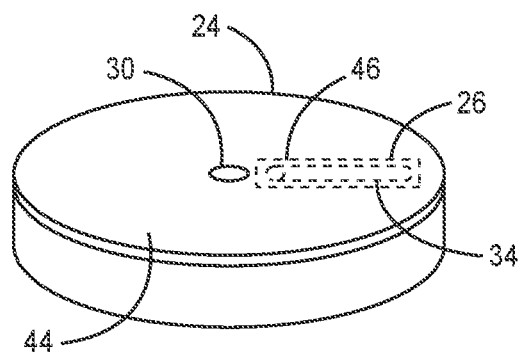
FIG. 2E is a perspective view of the rotor with an automatically closing lid of FIG. 2D, having the lid closed.

In implementations such as that of FIG. 2D, the rotor 24 has a container 34 in the opening 26. The rotor 24 also has a lid 44 that automatically closes when the rotor starts to rotate, moving the tube opening 26 to a second location (shown on the right side at 46) so as to seal the tube area, as would be understood by the skilled artisan. In certain embodiments, the seal is hermetic or fluidic. Still in other embodiments, the described sealing can trigger a mechanical latch to hold the lid in a sealed position.

Figure 3A:
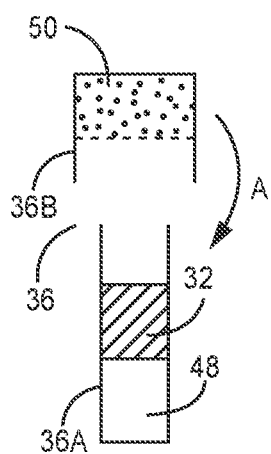
FIG. 3A is a side view of a tube for sample collection containing a gel and a reagent, according to one embodiment.

Turning to the implementation of FIG. 3A, a tube 36 having first 36A and second 36B elongate segments is shown. In this implementation, the segments 36A, 36B define internal lumens and are constructed and arranged to be fitted to one another, as would be understood, such that the second segment 36B serves as a "cap" to the first segment 36A, as shown by reference arrow A, and such that various components may be disposed within and fluids may flow therethrough.

In exemplary embodiments, the tube 36 comprises a gel 48 and a chemical reagent 50. In various implementations, the gel 48 can have thixotropic properties and become more liquid under shear, thus allowing the passage of certain bodily fluid components when the centrifugation occurs.

It is understood that in various implementations the chemical reagent 50 can be any of several reagents such as protease or nuclease inhibitors for preventing the degradation of proteins of RNA/DNA. The chemical reagent 50 may also contain various other known inhibitors, pHs, and/or salt concentrations that will prolong the preservation of the sample 32 as is known to an ordinary artisan. It is further understood that in use, the various components 48, 50, and a sample 32 can be disposed within the tube 36 so as to interact in a prescribed manner during centrifugation of the tube 36.

Figure 3B:
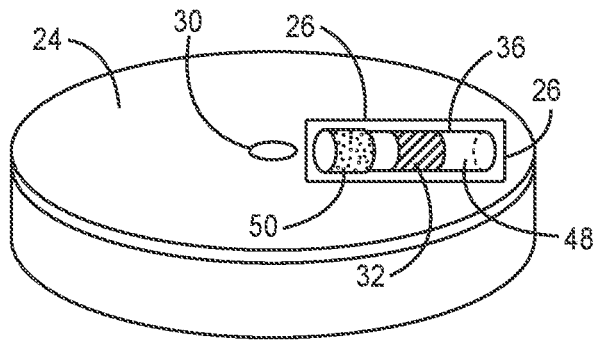
FIG. 3B is a perspective view of the rotor with the tube, with the gel and reagent, in the opening for centrifugation, according to one embodiment.
Figure 3C:
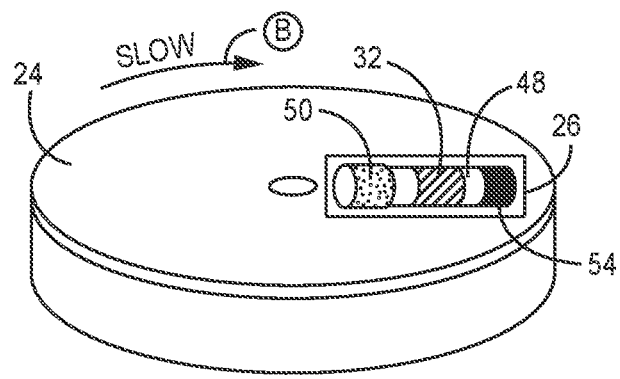
FIG. 3C is a perspective view of the rotor with a tube in place when the rotor is set to a slow speed centrifugation, according to one embodiment.
Figure 3D:
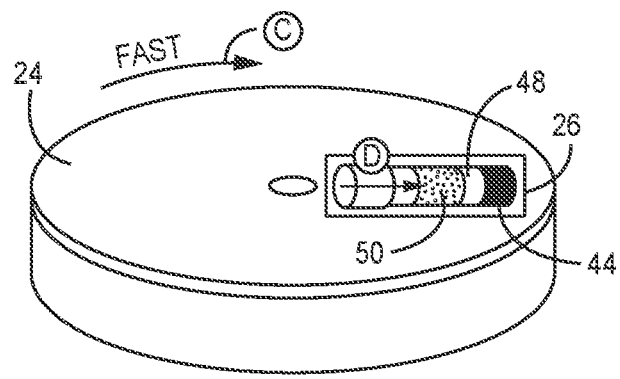
FIG. 3D is a perspective view of the rotor with the tube for sample collection wherein the rotor is set to a fast speed for centrifugation, according to one embodiment.

As shown in FIG. 3B, FIG. 3C and FIG. 3D, the rotor 24 has been fitted with a tube 36 that has a sample 32, a gel 48, and a chemical reagent 50 that is to be selectively applied to the sample 32. The first action of the centrifuge, shown in FIG. 3C, can be to use a first speed (reference arrow B) such as a slower speed, to separate the sample 32 into constituent parts 54. In various implementations, the sample 32 can be separated by or into the gel 48.

Following separation, as shown in FIG. 3D at reference arrow D, in some embodiments the centrifuge system 10 can also incorporate a shaking or vibration to mix the sample 32. In some embodiments, the chemical reagent 50 can be added before separation of components. In some embodiments, the gel 48 is not necessary in the tube. It is understood that many implementations are possible.

Figure 4A:
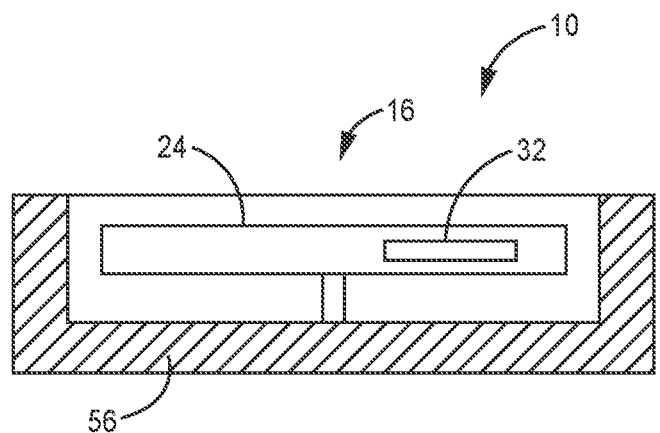
FIG. 4A is a top view of a centrifuge unit with an insulation and/or wax system for stabilization of the sample temperature, according to one embodiment.
Figure 4B:
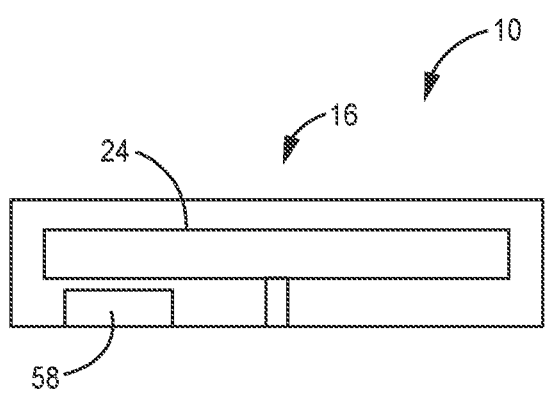
FIG. 4B is a top view of a centrifuge unit with a micro-cooling system for stabilization of the sample temperature, according to one embodiment.

In the implementations of FIG. 4A and FIG. 4B, the centrifuge system 10 keeps the contents at a stables temperature. In these implementations, a phase-changing material 56, such as paraffin, that is constructed and arranged to keep the sample 32 at room temperature or buffer temperature spikes.

In another embodiment shown in FIG. 4B, a small cooling element 58 is disposed below or otherwise proximal to the centrifuge 16 so as to actively cool the sample 32 for room temperature or refrigerated shipping.

In addition to the aforementioned temperature control techniques, in various implementations of the centrifuge system 10 a temperature logging module is integrated into the electronics of the device, thereby allowing for the tracking of temperatures throughout the operation and shipping process described herein. Samples that have been subjected to out-of-specification conditions, either due to harsh conditions or a failure of the temperature control methods can thus be rejected.

In various implementations, the temperature history of a sample can be read wirelessly upon reception of the device and a decision to accept or reject the sample can be made based on that knowledge and the type of sample that was requested by the clinician.

Figure 5A:
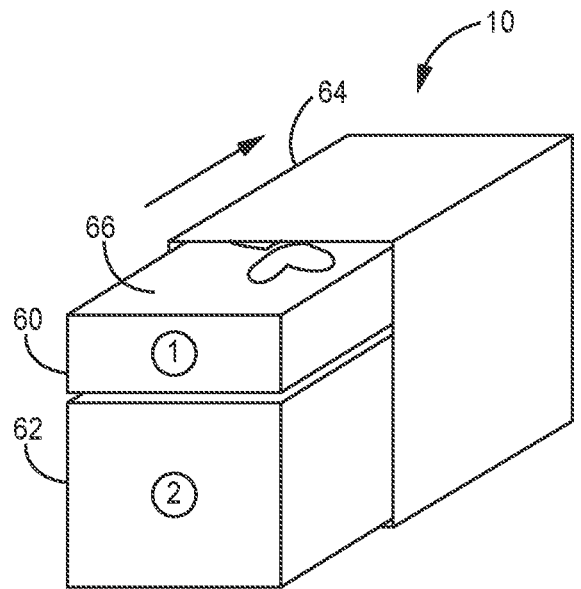
FIG. 5A is a perspective view of a triple containment of the sample for transportation, according to one embodiment.
Figure 5B:
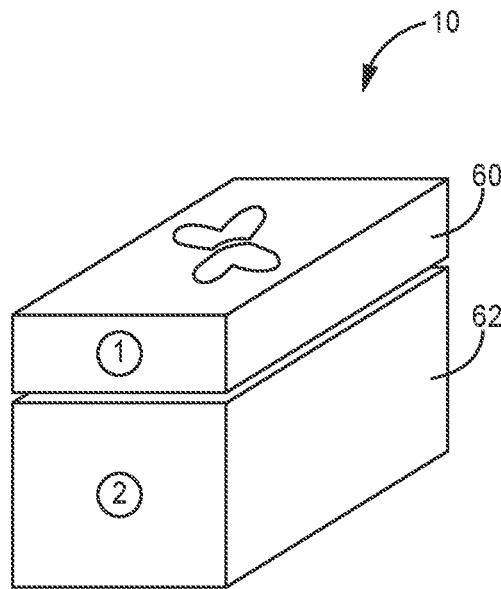
FIG. 5B is a perspective view of the unit after it has been removed from the shipping box wherein two sub-units are being separated to reveal the centrifugation system, according to one embodiment.
Figure 5C:
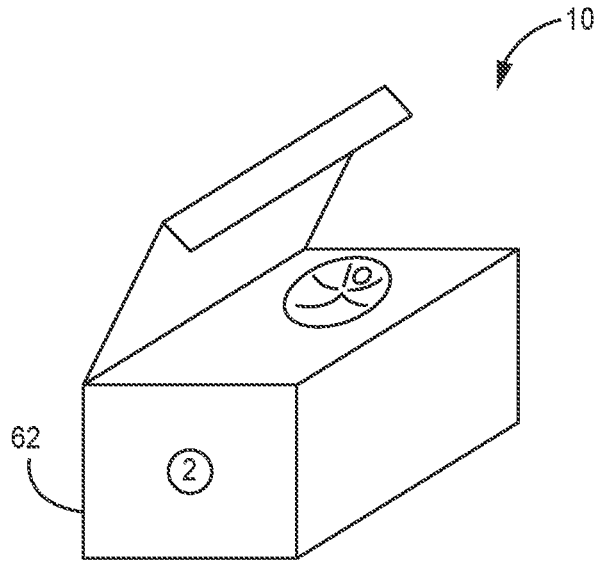
FIG. 5C is a perspective view of the second sub-unit wherein the lid is ajar, exposing the centrifugation system, according to one embodiment.

FIG. 5A, FIG. 5B and FIG. 5C depict another embodiment of the centrifuge system 10. In these implementations, the centrifuge system 10 can be housed in a package that contains sub-units 60, 62. In use, by removing the outer sleeve 64 reveals the sub-units 60, 62 as well as a high-level instruction sheet 66. In one implementation, the first sub-unit 60 contains the sample collection unit as well as the materials required for sample collection.

The second sub-unit 62 contains a sample preparation and shipping unit. Once the sample is collected, it is placed in a receptacle in the second sub-unit 62. In these implementations, the sample preparation is actuated upon closing which can include centrifugation, time and temperature logging, refrigeration, tamper proofing, and recording to account for chain of custody.

In order to make the whole process achievable at home, the centrifuge is only one element of a larger kit. The centrifuge must be placed in a simple to understand workflow that the user can go through.

Although the disclosure has been described with reference to preferred embodiments, persons skilled in the art will recognize that changes may be made in form and detail without departing from the spirit and scope of the disclosed apparatus, systems and methods.

We claim:

1. A shippable centrifuge system, comprising:
   an outer container shippable to and from a location of a patient;
   a primary container having a lumen sized and shaped to receive a biological sample from the patient;
   a primary seal operable to seal the biological sample within the lumen;
   a secondary seal operable to seal a compartment around the primary container including the biological sample therein;
   a centrifuge assembly positioned within the outer container, wherein the centrifuge assembly includes
      a rotor having an opening sized and shaped to receive the primary container including the biological sample therein from the patient at the location of the patient; and
      a counterweight positioned opposite the opening;
      a lid moveable between a closed position and an open position; and
   an electronics system carried by the outer container and communicatively coupled to the centrifuge assembly, wherein the electronics system includes
      a switch positioned to be activated when the lid is moved from the open position to the closed position and deactivated when the lid is moved from the closed position to the open position; and
      one or more processors programmed to execute centrifuge operation instructions stored in a non-transitory computer-readable storage medium; the centrifuge operations comprising
      centrifuging the biological sample for a centrifugation duration and at a centrifugation speed when the switch is activated, wherein at least one of the centrifugation duration and the centrifugation speed are prespecified before shipping of the outer container to the location of the patient;
      preventing further centrifugation of the biological sample after the biological sample has been centrifuged for the centrifugation duration; and
      stopping centrifugation of the biological sample if the switch is deactivated during the centrifugation duration; and
   a power source carried by the outer container and configured to provide power to the electronics system and the centrifuge assembly.

2. The shippable centrifuge system of claim 1 wherein the centrifuge operations cause centrifuging of the biological sample, via the centrifuge assembly, for the centrifugation duration and at the centrifugation speed after expiration of a timer initiated when the switch is activated.

3. The shippable centrifuge system of claim 2 wherein the timer is prespecified before shipping of the outer container to the location of the patient.

4. The shippable centrifuge system of claim 2 wherein the timer has a duration selected to ensure that the biological sample has sufficient time to absorb a reagent.

5. The shippable centrifuge system of claim 2 wherein the timer has a duration selected to ensure that the biological sample has sufficient time to clot.

6. The shippable centrifuge system of claim 2 wherein the timer has a duration selected to ensure that the biological sample has sufficient time to come to a specified temperature.

7. The shippable centrifuge system of claim 1 wherein the outer container is disposable.

8. The shippable centrifuge system of claim 1 wherein the compartment is the opening in the rotor, and wherein the rotor includes the secondary seal.

9. The shippable centrifuge system of claim 1 wherein the compartment is the opening in the rotor, wherein the rotor includes the lid, wherein the lid is movable over the opening between the open position and the closed position, and wherein the lid and the rotor define the secondary seal.

10. The shippable centrifuge system of claim 9 wherein
    when the lid is in the open position, the opening is accessible to receive the primary container, and
    when the lid is in the closed position, the opening is sealed.

11. The shippable centrifuge system of claim 9 wherein the lid is positioned to automatically move from the open position to the closed position.

12. The shippable centrifuge system of claim 9 wherein the lid is positioned to automatically move from the open position to the closed position when the centrifuge assembly centrifuges the biological sample.

13. The shippable centrifuge system of claim 1 wherein the outer container includes the secondary seal.

14. The shippable centrifuge system of claim 1 wherein the secondary seal comprises a secondary container positioned around the primary container.

15. The shippable centrifuge system of claim 14 wherein the secondary container is removably positionable in the opening in the rotor.

16. The shippable centrifuge system of claim 14 wherein the secondary container is integrally formed with the rotor.

17. The shippable centrifuge system of claim 1 wherein the electronics system includes a communications component configured to wirelessly transmit data about the biological sample, and wherein the data includes at least one of a temperature of the biological sample and a time associated with the biological sample.

18. The shippable centrifuge system of claim 1 wherein the biological sample is blood.

19. The shippable centrifuge system of claim 1 wherein the outer container is disposable, and wherein the centrifuge assembly and the electronics system are reusable.

20. The shippable centrifuge system of claim 1, further comprising a fluid-absorbent material positioned between the primary seal and the secondary seal.

21. The shippable centrifuge system of claim 1 wherein the centrifuge operations further comprise recording at least one of the centrifugation speed and whether centrifugation was stopped because the switch was deactivated during the centrifugation duration.

22. The shippable centrifuge system of claim 1 wherein the electronics system further includes a receiver configured to receive the centrifugation duration and the centrifugation speed before shipping of the outer container to the location of the patient.

23. The shippable centrifuge system of claim 22 wherein the receiver is a wireless receiver.

24. The shippable centrifuge system of claim 1 wherein the centrifuge assembly further comprises a housing defining the compartment, and wherein the rotor and the counterweight are positioned within the compartment.

25. The shippable centrifuge system of claim 24 wherein the lid is coupled to the housing, wherein the lid is moveable between the closed position and the open position over the compartment.

26. The shippable centrifuge system of claim 25 wherein the secondary seal is positioned between the lid and the housing.

27. A method of centrifuging a biological sample from a patient, the method comprising:
- shipping a centrifuge assembly to a patient within an outer container, wherein the centrifuge assembly comprises
  - a housing;
  - a rotor rotatably positioned within the housing and having an opening sized and shaped to receive a primary container including the biological sample;
  - a counterweight positioned opposite the opening; and
  - a lid coupled to the housing and moveable between a closed position and open position;
- receiving the primary container including the biological sample within the opening of the rotor with the lid in the open position, wherein the primary container includes a primary seal sealing the biological sample within the primary container;
- detecting, via a switch, that the lid has been moved from the open position to the closed position;
- sealing a secondary seal to seal a compartment around the primary container;
- after detecting that the lid has been moved from the open position to the closed position,
  - rotating the rotor and the counterweight to centrifuge the biological sample for a centrifugation duration and at a centrifugation speed, wherein at least one of the centrifugation duration and the centrifugation speed are prespecified before shipping of the centrifuge assembly to the patient within the outer container;
  - preventing further centrifugation of the biological sample after the biological sample has been centrifuged for the centrifugation duration; and
- if the switch is deactivated during the centrifugation duration, stopping centrifugation of the biological sample.

28. The method of claim 27 wherein the housing of the centrifuge assembly defines the compartment, wherein the lid is moveable between the closed position and the open position over the compartment, wherein the secondary seal is positioned between the lid and the housing, and wherein sealing the secondary seal includes moving the lid to the closed position.

29. A shippable centrifuge system, comprising:
- an outer container shippable to and from a location of a patient a centrifuge assembly positioned within the outer container, wherein the centrifuge assembly includes
  - a housing defining a compartment;
  - a rotor rotatably positioned within the compartment and having an opening sized and shaped to receive a blood collection tube including a blood sample therein from the patient at the location of the patient, wherein the blood collection tube includes a removable cap defining a primary seal;
  - a counterweight positioned opposite the opening and rotatable with the rotor;
  - a lid coupled to the housing and moveable between a closed position and an open position over the compartment; and
  - a secondary seal between the lid and the housing, wherein the secondary seal is positioned to seal the compartment around the rotor and the blood collection tube when the lid is in the closed position; and
- an electronics system carried by the outer container and communicatively coupled to the centrifuge assembly, wherein the electronics system includes
  - a switch between the lid and the housing, wherein the switch is positioned to be activated when the lid is moved from the open position to the closed position and deactivated when the lid is moved from the closed position to the open position; and
  - one or more processors programmed to execute centrifuge operation instructions stored in a non-transitory computer-readable storage medium, the centrifuge operations comprising
    - centrifuging the biological sample for a centrifugation duration and at a centrifugation speed when the switch is activated, wherein at least one of the centrifugation duration and the centrifugation speed are prespecified before shipping of the outer container to the location of the patient;
    - preventing further centrifugation of the biological sample after the biological sample has been centrifuged for the centrifugation duration; and
    - stopping centrifugation of the biological sample if the switch is deactivated during the centrifugation duration; and a power source carried by the housing and configured to provide power to the electronics system and the centrifuge assembly.

30. The shippable centrifuge system of claim 29, further comprising a fluid-absorbent material positioned between the primary seal and the secondary seal.

* * * * *